United States Patent
Son et al.

(10) Patent No.: US 10,839,563 B2
(45) Date of Patent: Nov. 17, 2020

(54) METHOD AND APPARATUS FOR PROCESSING IMAGE INTERACTION

(71) Applicant: Samsung Electronics Co., Ltd., Suwon-si (KR)

(72) Inventors: Minjung Son, Suwon-si (KR); Hyun Sung Chang, Seoul (KR); Donghoon Sagong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 126 days.

(21) Appl. No.: 15/952,389

(22) Filed: Apr. 13, 2018

(65) Prior Publication Data

US 2019/0188882 A1 Jun. 20, 2019

(30) Foreign Application Priority Data

Dec. 20, 2017 (KR) .......................... 10-2017-0175942

(51) Int. Cl.
| | | |
|---|---|---|
| *G06T 9/00* | (2006.01) | |
| *G06T 3/00* | (2006.01) | |
| *G06N 3/08* | (2006.01) | |
| *G06F 3/048* | (2013.01) | |
| *G06N 3/04* | (2006.01) | |
| *G06T 3/20* | (2006.01) | |
| *G06T 3/60* | (2006.01) | |

(52) U.S. Cl.
CPC .............. *G06T 9/002* (2013.01); *G06F 3/048* (2013.01); *G06N 3/0454* (2013.01); *G06N 3/0472* (2013.01); *G06N 3/08* (2013.01); *G06T 3/0012* (2013.01); *G06T 3/20* (2013.01); *G06T 3/60* (2013.01)

(58) Field of Classification Search
CPC ......... G06T 9/002; G06T 3/0012; G06T 3/20; G06T 3/60; G06N 3/08
See application file for complete search history.

(56) References Cited

U.S. PATENT DOCUMENTS

| | | | | |
|---|---|---|---|---|
| 5,028,102 | A * | 7/1991 | Ogura ...................... | G03H 1/08 359/107 |
| 5,335,294 | A * | 8/1994 | Niki ...................... | G06K 9/2054 382/177 |
| 7,295,711 | B1 * | 11/2007 | Ahuja .................... | G06K 9/342 375/E7.076 |

(Continued)

FOREIGN PATENT DOCUMENTS

| | | |
|---|---|---|
| EP | 3 166 049 A1 | 5/2017 |
| JP | 2017-86542 A | 5/2017 |

(Continued)

OTHER PUBLICATIONS

Google Scholar Search Results.*

(Continued)

*Primary Examiner* — Qun Shen
(74) *Attorney, Agent, or Firm* — NSIP Law

(57) ABSTRACT

A method and apparatus for processing an image interaction are provided. The apparatus extracts, using an encoder, an input feature from an input image, converts the input feature to a second feature based on an interaction for an application to the input image, and generates, using a decoder, a result image from the second feature.

27 Claims, 11 Drawing Sheets

Input image    Feature extraction          Image generation    Result image

(56) References Cited

U.S. PATENT DOCUMENTS

| | | | |
|---|---|---|---|
| 2002/0122067 A1* | 9/2002 | Geigel | G06T 11/60 715/788 |
| 2005/0243920 A1* | 11/2005 | Murakami | H04N 19/61 375/240.12 |
| 2011/0229025 A1* | 9/2011 | Zhao | G06K 9/4671 382/165 |
| 2012/0062736 A1 | 3/2012 | Xiong | |
| 2014/0055554 A1 | 2/2014 | Du et al. | |
| 2015/0213062 A1 | 7/2015 | Gokturk et al. | |
| 2015/0233720 A1* | 8/2015 | Harada | G06K 9/00523 701/409 |
| 2016/0125218 A1* | 5/2016 | Deppieri | G06K 9/183 235/454 |
| 2016/0343165 A1 | 11/2016 | Park et al. | |
| 2017/0123492 A1 | 5/2017 | Marggraff et al. | |
| 2017/0124432 A1* | 5/2017 | Chen | G06N 3/0454 |
| 2017/0213070 A1 | 7/2017 | Aghamohammadi et al. | |
| 2018/0113672 A1* | 4/2018 | Klein | G06F 3/167 |
| 2018/0253869 A1 | 9/2018 | Yumer et al. | |
| 2019/0087409 A1* | 3/2019 | Farrell | G06F 17/2785 |
| 2019/0205606 A1* | 7/2019 | Zhou | G06N 3/0445 |

FOREIGN PATENT DOCUMENTS

| | | |
|---|---|---|
| KR | 10-2011-0129042 A | 12/2011 |
| KR | 10-2012-0086266 A | 8/2012 |
| KR | 10-1470757 B1 | 12/2014 |
| KR | 10-1684139 B1 | 12/2016 |
| KR | 10-1716326 B1 | 3/2017 |

OTHER PUBLICATIONS

Xu, Ning et al., "Deep Interactive Object Selection", 2016 *IEEE Conference on Computer Vision and Pattern Recognition* (CVPR), 2016 (9 pages in English).

Baumann, Malte, "Deep Learning for Photo Editing", *img.ly*, Apr. 20, 2017 (13 pages in English).

Jang, Won-Dong et al., "Online Video Object Segmentation via Convolutional Trident Network", 2017 *IEEE Conference on Computer Vision and Pattern Recognition* (*CVPR*), 2017 (10 Pages English).

Zhang, Richard et al., "Real-Time User-Guided Image Colorization with Learned Deep Priors", *ACM Transactions on Graphics*, vol. 36 Issue 4, Jul. 2017 (pp. 1-11).

Extended European Search Report dated May 21, 2019 in counterpart European Application No. 18199276.9 (10 pages in English).

Newcombe, Richard A., et al. "KinectFusion: Real-Time Dense Surface Mapping and Tracking." *2011 10th IEEE International Symposium on Mixed and Augmented Reality*, Oct. 28, 2011 (pp. 127-136).

Pradeep, Vivek, et al. "MonoFusion: Real-time 3D Reconstruction of Small Scenes with a Single Web Camera" 2013 IEEE International Symposium on Mixed and Augmented Reality (ISMAR), 2013 (pp. 83-88).

Yang, Jimei, et al. "Weakly-Supervised Disentangling with Recurrent Transformations for 3D View Synfhesis." Advances in Neural Information Processing Systems, 2015 (9 pages in English).

* cited by examiner

FIG. 5
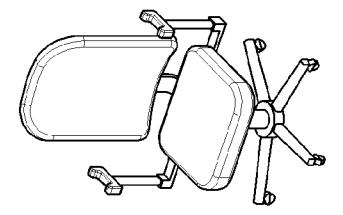
Result image
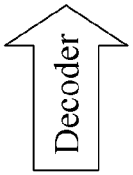
Image generation
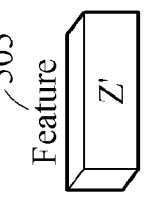
Feature 505 Z'
Feature conversion
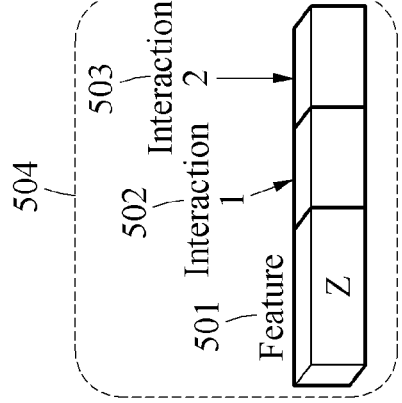
504
503 Interaction 2
502 Interaction 1
501 Feature Z
Addition of interaction
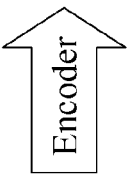
Encoder
Feature extraction
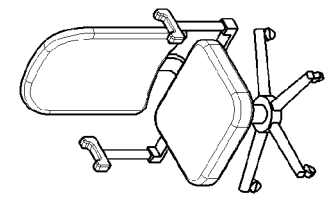
Input image

FIG. 7
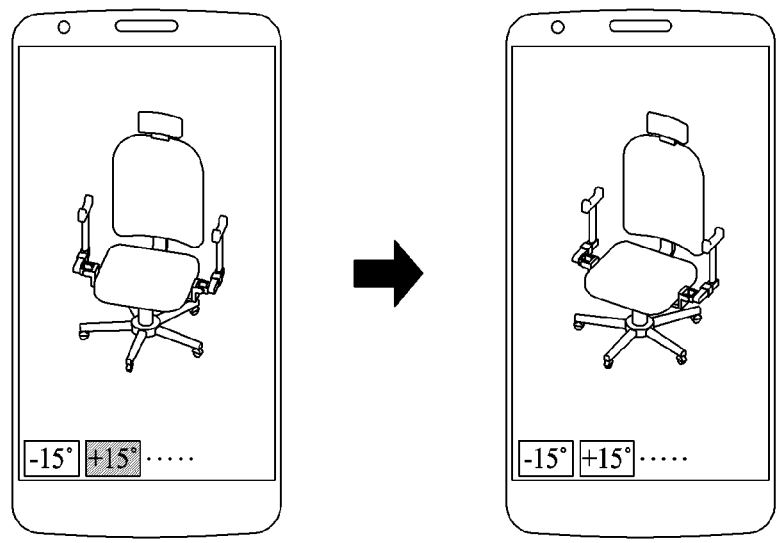
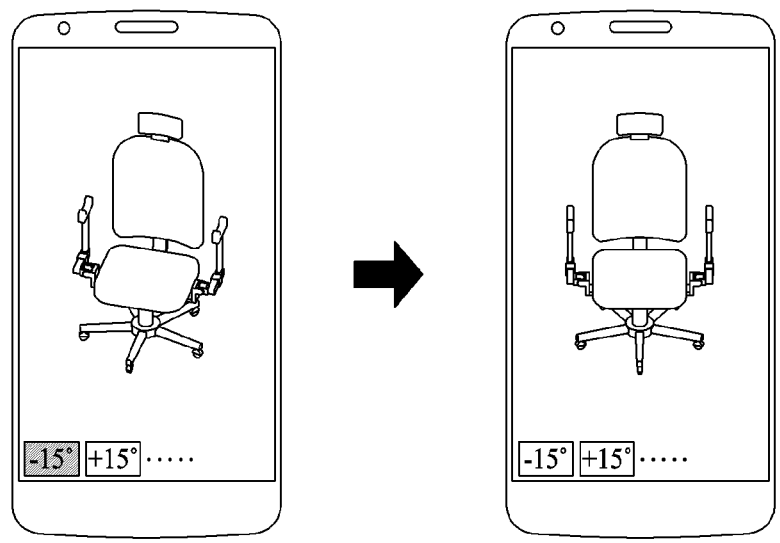

METHOD AND APPARATUS FOR PROCESSING IMAGE INTERACTION

CROSS-REFERENCE TO RELATED APPLICATIONS

This application claims the benefit under 35 USC § 119(a) of Korean Patent Application No. 10-2017-0175942, filed on Dec. 20, 2017, in the Korean Intellectual Property Office, the entire disclosure of which is incorporated herein by reference for all purposes.

BACKGROUND

1. Field

The following description relates to processing an image interaction.

2. Description of Related Art

Image processing techniques to apply an interaction to an image have been proposed. To realize an augmented reality (AR), an image interaction is processed to combine a virtual world with a real world. Techniques of applying an interaction with a user to an object in an image to increase a sense of experience and to realize a more realistic AR have been proposed.

For processing of an image interaction, three-dimensional (3D) information is extracted from a two-dimensional (2D) image, and a 3D image is reconstructed. To apply an interaction, techniques of generating a 2D image after rendering a 3D image are widely utilized. Also, research is being actively conducted on neural network-based interaction processing techniques. However, because such operations or applications are performed through such specialized computation architectures, and in different automated manners than they would have been performed in non-computer implemented or non-automated approaches, they also invite problems or drawbacks that only occur because of the automated and specialized computational architecture manner that are used for its implementation. For example, a large number of errors occur in techniques that use 3D information due to a demand for a large amount of information, and thus, the usability is reduced. Also, an extensibility of research related to a neural network-based interaction processing is reduced due to a limitation to processing of a set interaction. Thus, there is a demand for an image interaction processing technology that guarantees a good performance of an image interaction processing with a relatively high scalability.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of processing an image interaction, the method including extracting, using an encoder, an input feature from an input image, converting the input feature to a second feature based on an interaction for an application to the input image, and generating, using a decoder, a result image from the second feature.

The converting of the input feature may include combining a feature map corresponding to the interaction with the input feature, and converting, using a conversion network, the input feature combined with the feature map to the second feature that may be suitable for an input of the decoder.

The feature map may include a value corresponding to the interaction.

The method may include identifying an interaction for application to the input image from a user input, wherein the converting of the input feature may include generating a feature map for combination with the input feature using a value corresponding to the identified interaction.

The converting of the input feature may include combining the input feature with a first feature map corresponding to a first interaction and a second feature map corresponding to a second interaction, and converting the input feature combined with the first feature map and the second feature map to the second feature that may be suitable for an input of the decoder.

The converting of the input feature may include selecting a conversion network corresponding to the interaction from conversion networks defined for each interaction, and converting the input feature to the second feature using the selected conversion network.

The method may include identifying an interaction for an application to the input image from a user input, wherein the converting of the input feature further may include identifying a conversion network corresponding to the identified interaction from the conversion networks.

The input image and the result image may be single-channel two-dimensional (2D) images, the input feature may include feature maps that have spatial sizes less than a spatial size of the input image, and the second feature may include feature maps that have spatial sizes less than a spatial size of the result image.

The spatial size of the input image may be equal to the spatial size of the result image.

The encoder may include a convolutional neural network (CNN) configured to generate a multi-channel feature from a single-channel 2D image, and the decoder may include a CNN configured to generate a single-channel 2D image from a multi-channel feature.

The interaction may include any one or any combination of a rotation, a movement and a transformation of an object in the input image.

In another general aspect, there is provided a training method to process an image interaction, the training method including extracting, using an encoder, a training input feature from a training input image, converting, using a conversion network, the training input feature to a second feature based on an interaction for an application to the training input image, generating, using a decoder, a training result image from the second feature, and training the conversion network so that the training result image may be substantially identical to an image generated by applying the interaction to the training input image.

The converting of the training input feature may include combining a feature map corresponding to the interaction with the training input feature, and converting, using the conversion network, the training input feature may be combined with the feature map to the second feature that may be suitable for an input of the decoder.

The converting of the training input feature may include combining the training input feature with a first feature map corresponding to a first interaction and a second feature map corresponding to a second interaction, and converting, using the conversion network, the training input feature may be combined with the first feature map and the second feature map to the second feature that may be suitable for an input of the decoder.

The converting of the training input feature may include applying a weight to a first feature map, in response to a feature map corresponding to the interaction being absent, and converting, using the conversion network, the training input feature combined with the first feature map to the second feature that may be suitable for an input of the decoder.

The converting of the training input feature may include combining a first feature map with a second feature map to obtain a combined feature map, in response to a feature map corresponding to the interaction being absent, and converting, using the conversion network, the training input feature combined with the combined feature map to the second feature that may be suitable for an input of the decoder.

The converting of the training input feature may include selecting a conversion network corresponding to the interaction from conversion networks defined for each interaction, and converting the training input feature to the second feature using the selected conversion network.

The training method may include training the encoder and the decoder so that the training result image may be substantially identical to the image generated by applying the interaction to the training input image.

The training input features may be extracted by the encoder from training input images, training result images may be generated by the decoder from the training input features, and the encoder and the decoder may be pre-trained so that the training input images are substantially identical to the training result images.

In another general aspect, there is provided an apparatus for processing an image interaction, the apparatus including a processor including an encoder and a decoder, the processor being configured to extract, using the encoder, an input feature from an input image, convert the input feature to a second feature based on an interaction for an application to the input image, and generate, using the decoder, a result image from the second feature.

The processor may be configured to combine a feature map corresponding to the interaction with the input feature, and convert, using a conversion network, the input feature combined with the feature map to the second feature that may be suitable for an input of the decoder.

The processor may be configured to combine the input feature with a first feature map corresponding to a first interaction and a second feature map corresponding to a second interaction, and convert the input feature combined with the first feature map and the second feature map to the second feature that may be suitable for an input of the decoder.

The processor may be configured to select a conversion network corresponding to the interaction from conversion networks defined for each interaction, and convert the input feature to the second feature using the selected conversion network.

The input image and the result image may be single-channel two-dimensional (2D) images, the input feature may include feature maps that have spatial sizes less than a spatial size of the input image, and the second feature may include feature maps that have spatial sizes less than a spatial size of the result image.

The encoder may include a convolutional neural network (CNN) configured to generate a multi-channel feature from a single-channel 2D image, and the decoder may include a CNN configured to generate a single-channel 2D image from a multi-channel feature.

The interaction may include any one or any combination of a rotation, a movement and a transformation of an object in the input image.

In another general aspect, there is provided a training apparatus to process an image interaction, the training apparatus including a processor including an encoder and a decoder, the processor being configured to extract, using the encoder, a training input feature from a training input image, convert, using a conversion network, the training input feature to a second feature based on an interaction for an application to the training input image, generate, using the decoder, a training result image from the second feature, and train the conversion network so that the training result image may be substantially identical to an image generated by applying the interaction to the training input image.

The processor may be configured to combine a feature map corresponding to the interaction with the training input feature, and convert, using the conversion network, the training input feature combined with the feature map to the second feature that may be suitable for an input of the decoder.

The processor may be configured to combine the training input feature with a first feature map corresponding to a first interaction and a second feature map corresponding to a second interaction, and convert, using the conversion network, the training input feature combined with the first feature map and the second feature map to the second feature that may be suitable for an input of the decoder.

The processor may be configured to select a conversion network corresponding to the interaction from conversion networks defined for each interaction, and convert the training input feature to the second feature using the selected conversion network.

Other features and aspects will be apparent from the following detailed description, the drawings, and the claims.

BRIEF DESCRIPTION OF THE DRAWINGS

FIG. 5 illustrates an example of a feature conversion operation.

FIG. 7 illustrates an example of an image interaction processing method.

Figure 1:
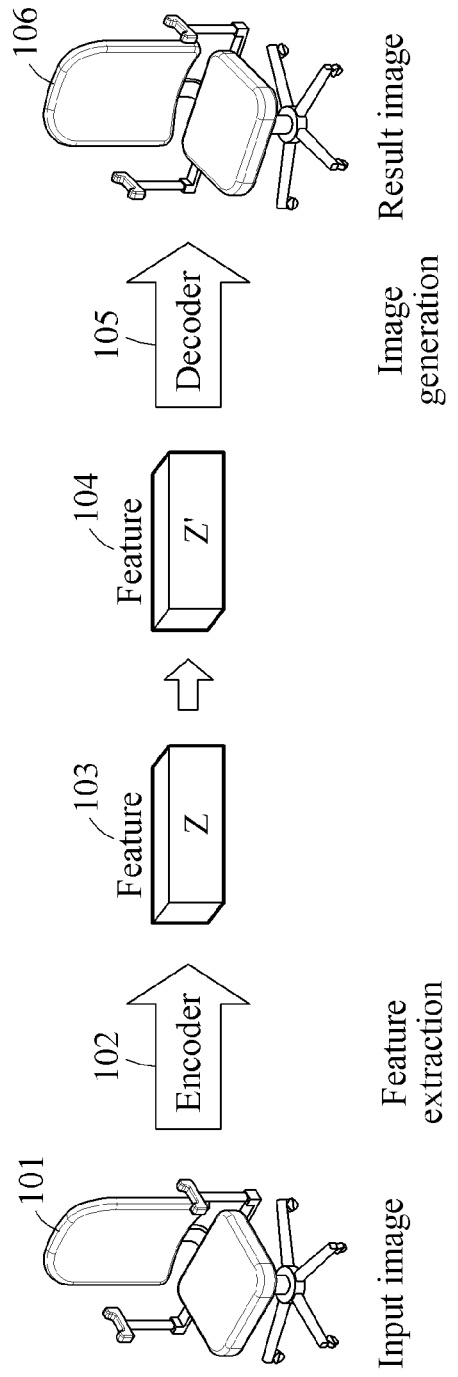
FIG. 1 illustrates an example of an image interaction processing method.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions of examples disclosed in the present disclosure are merely intended for the purpose of describing the examples and the examples may be implemented in various forms. The examples are not meant to be limited, but it is intended that various modifications, equivalents, and alternatives are also covered within the scope of the claims.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present. As used herein, the singular forms are intended to include the plural forms as well, unless the context clearly indicates otherwise.

Hereinafter, examples will be described in detail with reference to the accompanying drawings, and like reference numerals in the drawings refer to like elements throughout.

According to examples, an image interaction processing apparatus (hereinafter, referred to as an "image processing apparatus") is an apparatus for processing an image interaction, and is implemented on a hardware module. In an example, the image processing apparatus generates or processes an operation, an arithmetic operation or a command related to an image interaction.

In an example, the image processing apparatus is included in various types of products, such as, for example, an intelligent agent, a mobile phone, a cellular phone, a smart phone, a wearable smart device (such as, a ring, a watch, a pair of glasses, glasses-type device, a bracelet, an ankle bracket, a belt, a necklace, an earring, a headband, a helmet, a device embedded in the cloths, or an eye glass display (EGD)), a server, personal computers (PC), laptop computers, tablet computers, a laptop, a notebook, a subnotebook, a netbook, an ultra-mobile PC (UMPC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device, portable navigation device (PND), a handheld game console, an e-book, televisions (TVs), a high definition television (HDTV), a smart appliance, a smart home appliances, an intelligent vehicles, kiosks, a biometrics-based door lock, a security device, a financial service device, communication systems, image processing systems, graphics processing systems, various Internet of Things (IoT) devices that are controlled through a network, a smart vehicle, other consumer electronics/information technology (CE/IT) device, or any other device capable of wireless communication or network communication consistent with that disclosed herein.

In an example, the image processing apparatus described herein may be incorporated in a vehicle. The vehicle described herein refers to any mode of transportation, delivery, or communication such as, for example, an automobile, a truck, a tractor, a scooter, a motorcycle, a cycle, an amphibious vehicle, a snowmobile, a boat, a public transit vehicle, a bus, a monorail, a train, a tram, an autonomous or automated driving vehicle, an intelligent vehicle, a self-driving vehicle, an aircraft, an unmanned aerial vehicle, a drone, or a mobile device. In an example, the image processing apparatus is applicable to a robot requiring a positioning operation.

In an example, the image processing apparatus loads information associated with an encoder, a conversion network and a decoder from a pre-built database (DB). The DB may be implemented as, for example, a memory included in the image processing apparatus, or an external device such as a server that is connected to the image processing apparatus via a wire or network or wirelessly.

An image interaction is an effect applied to an image based on a user's input, an internal input or an external input of a device, or settings. The image interaction includes, for example, a change in a viewpoint of an image based on a characteristic of an object or a target included in the image, and a rotation, a movement and a transformation of an object included in an image. For example, in response to an input of a user, an interaction is performed to rotate or distort an object in an image.

For example, the image processing apparatus processes an image interaction using a technique of estimating three-dimensional (3D) information of an image or converting a feature extracted from the image instead of reconstructing a 3D image.

An operation of estimating 3D information of an image or reconstructing a 3D image to process an interaction in a two-dimensional (2D) image requires a large amount of calculation, and an error may occur in the calculation process. However, the image processing apparatus of the present disclosure directly converts a feature extracted from an image for application of an interaction instead of estimating 3D information. Accordingly, it is possible to increase an interaction processing, a degree of understanding of an image and an object recognition performance. In an example, the image processing apparatus recognizes a feature of an object in a 2D image, applies an interaction to an image, and generates a new image.

Hereinafter, an image interaction processing method will be described with reference to FIGS. 1 and 2. Examples of the image interaction processing method will be described with reference to FIGS. 3 through 8, and examples of a training method to process an image interaction will be described with reference to FIGS. 9 through 11. An example of a configuration of an image processing apparatus and a training apparatus will be described with reference to FIG. 12.

FIG. 1 illustrates an example of an image interaction processing.

Referring to FIG. 1, an image processing apparatus acquires an input image 101. The input image 101 includes at least one object for application of an interaction, and is a 2D image. The image processing apparatus may use any one or any combination of an encoder 102, a conversion network (not shown) and a decoder 105 as an external module or an internal module. In an example, the encoder 102 encodes input data and extracts a feature, and the decoder 105 decodes an input feature and reconstructs an image.

The encoder 102 is a kind of neural networks, and includes, for example, a neural network to encode input data and search for a feature representing the input data. The decoder 105 is also a kind of neural networks, and includes, for example, a neural network to decode an input feature and search for an image representing the input feature. The encoder 102 and the decoder 105 are implemented as, for example, any one or any combination of a convolutional neural network (CNN), a deep neural network (DNN), a recurrent neural network (RNN), a long short-term memory (LSTM) and a gated recurrent unit (GRU).

In an example, the encoder 102 and the decoder 105 correspond to a network as a single set, and are symmetrical with each other. For example, the encoder 102 is implemented as a classifier model to extract a feature from an image, and the decoder 105 is implemented as a generative model to generate an image from a feature. A set of the encoder 102 and the decoder 105 (hereinafter, referred to as an "encoder 102-decoder 105 network") includes an input layer, a hidden layer and an output layer. In an example, the network includes one or more input layers, one or more hidden layers, and one or more output layers. The input layer and the output layer may respectively include one or more nodes and the hidden layer(s) may each include a plurality of nodes. When an overall neural network includes multiple portions trained for different objectives, there may or may not be input layers or output layers between the different portions. In an example, a number of nodes in the input layer is equal to a number of nodes in the output layer.

A process of activating nodes from an input layer to a hidden layer is referred to as "encoding" or "embedding." A process of activating nodes from a hidden layer to an output layer is referred to as "decoding" or "reconstruction." In an example, a structure of "input layer→hidden layer" and a structure of "hidden layer→output layer" are symmetrical with each other.

The encoder 102-decoder 105 network encodes input data corresponding to the number of nodes in the input layer, generates a feature corresponding to a number of nodes in the hidden layer, decodes the generated feature, and generates output data corresponding to the number of nodes in the output layer. For example, a size of each of the input data, the generated feature and the output data is determined by the input layer, the hidden layer and the output layer of the encoder 102-decoder 105 network. In this example, the input data and the output data have the same size.

However, the encoder 102-decoder 105 network may not have symmetry structures of the encoder 102 and the decoder 105. Each of the encoder 102 and the decoder 105 includes an input layer, a hidden layer and an output layer, and the symmetry structures are variously applicable or modified depending on a design intent, a system efficiency, and a type of learning and recognition techniques employed. Each of the encoder 102 and the decoder 105 is implemented as a neural network to perform a feature extraction operation and an image generation operation, by employing various schemes.

Figure 2:
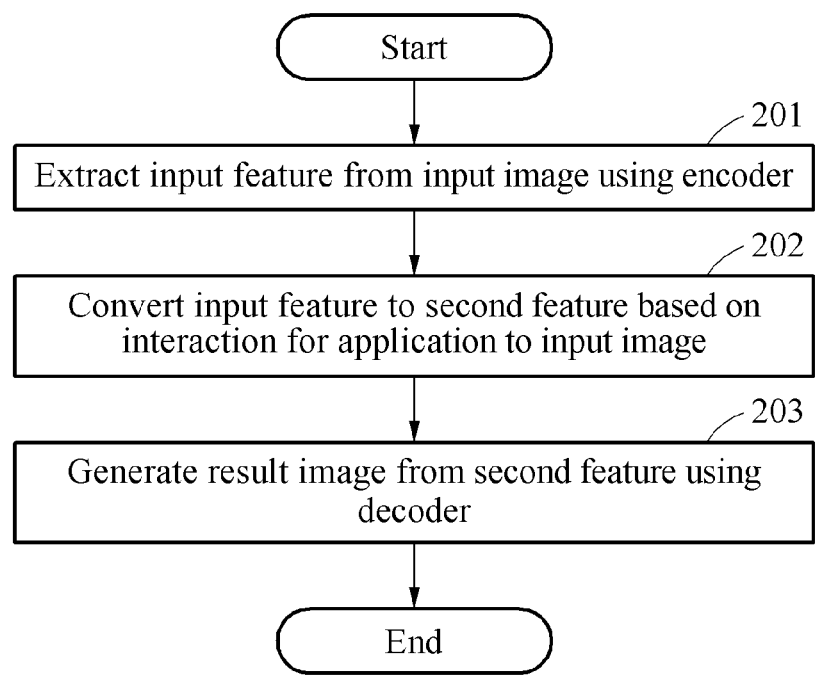
FIG. 2 is a diagram illustrating an example of the image interaction processing method.

FIG. 2 illustrates an example of a method of image interaction processing. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. One or more blocks of FIG. 2, and combinations of the blocks, can be implemented by special purpose hardware-based computer that perform the specified functions, or combinations of special purpose hardware and computer instructions. In addition to the description of FIG. 2 below, the descriptions of FIG. 1 are also applicable to FIG. 2, and are incorporated herein by reference. Thus, the above description may not be repeated here.

Referring to FIGS. 1 and 2, in operation 201, the image processing apparatus extracts an input feature 103 from the input image 101 using the encoder 102. In an example, the encoder 102 performs encoding to increase a number of channels instead of reducing a spatial size of the input image 101, and generates the input feature 103 that is an embedded data of the input image 101 as a result of the encoding. For example, a feature extracted by the encoder 102 is utilized to classify or identify images. In an example, the encoder 102 is employed as a classifier model.

In operation 202, the image processing apparatus converts the input feature 103 to a second feature 104 based on an interaction from an application to the input image 101. The image processing apparatus generates the second feature 104 that reflects the interaction, by applying a function or values corresponding to the interaction to the input feature 103. In an example, the second feature 104 is suitable for an input of the decoder 105. Examples of a feature conversion operation will be described below with reference to FIGS. 3 through 7.

In operation 203, the image processing apparatus generates a result image 106 from the second feature 104 using the decoder 105. The decoder 105 performs decoding to reduce a number of channels instead of increasing a spatial size of the second feature 104, and generates the result image 106 that is reconstructed data of the second feature 104 as a result of the decoding. For example, the decoder 105 is utilized to reconstruct an image from a feature. In an example, the decoder 105 is employed as a generative model.

The image processing apparatus converts the input feature 103 extracted by the encoder 102 to the second feature 104 using a scheme of applying the interaction to the input feature 103, and reconstructs the result image 106 from the second feature 104 using the decoder 105, to generate the result image 106 by applying the interaction to the input image 101. The interaction is, for example, a rotation of an object in a counterclockwise direction. The image processing apparatus performs a feature conversion operation instead of performing an intermediate process of estimating 3D information, and thus it is possible to increase an interaction processing performance. Also, it is possible to enhance a recognition performance through learning by utilizing the encoder 102, the conversion network and the decoder 105 that are based on deep learning.

Figure 3:
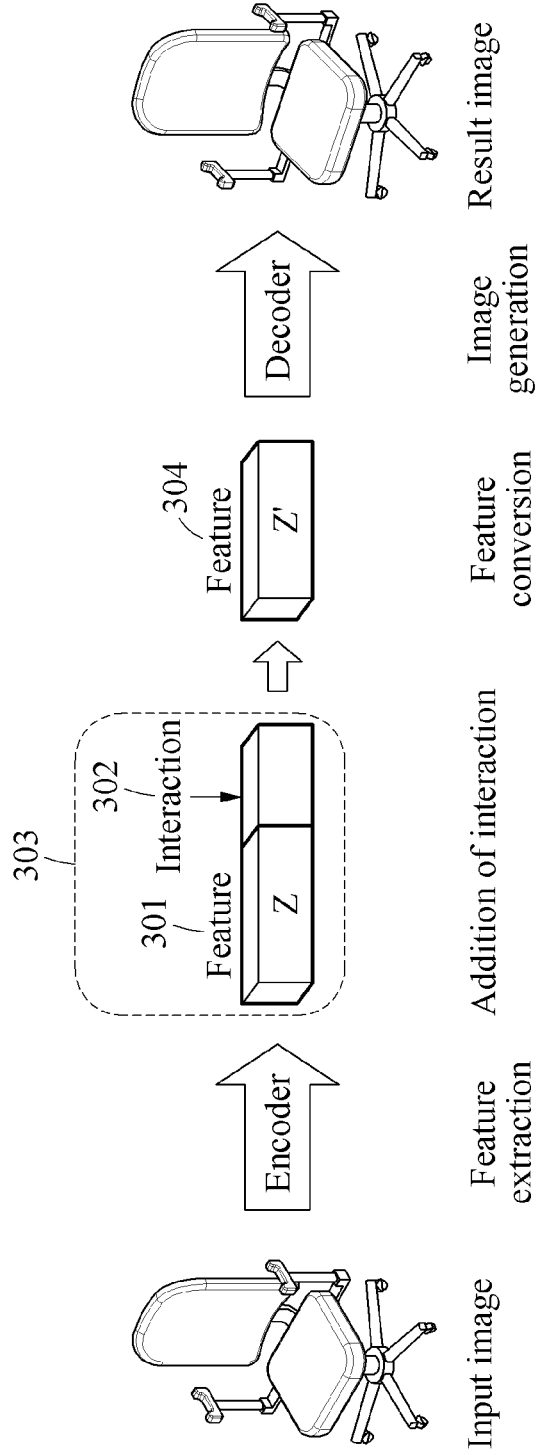
FIG. 3 illustrates an example of a feature conversion operation.

FIG. 3 illustrates an example of a feature conversion operation.

Referring to FIG. 3, an image processing apparatus acquires an input feature 301 generated by an encoder, and combines the input feature 301 with a feature map 302 corresponding to an interaction. The image processing apparatus converts, using a conversion network, an input feature 303 to which the feature map 302 is applied, to a second feature 304 to be suitable for an input of a decoder. The feature map 302 includes at least one value corresponding to the interaction.

In an example, the encoder used to generate the input feature 301 includes a CNN to generate a multi-channel feature from a single-channel 2D image. The decoder used to reconstruct an image from the second feature 304 includes a CNN to generate a single-channel 2D image from a multi-channel feature. The conversion network used to convert the input feature 303 to the second feature 304 includes a CNN. However, the encoder generates a feature from a multi-channel multi-dimensional image, and the decoder generates a multi-channel multi-dimensional image from the feature generated by the encoder. Also, a channel and a dimension of an image processed by the encoder and the decoder are variously changed depending on examples.

In machine learning, a CNN, which is a kind of neural networks, includes convolutional layers designed to perform a convolution operation. A convolutional layer of the CNN performs a convolution operation associated with an input using at least one kernel. For example, when the CNN includes a plurality of convolutional layers, the image processing apparatus performs a convolution operation of an input image using an encoder implemented as a CNN, performs a convolution operation of the input feature 303 using a conversion network implemented as a CNN, and performs a convolution operation of the second feature 304 using a decoder implemented as a CNN. A size of each of an input, at least one kernel and an output of each convolutional layer is defined based on a design of a corresponding convolutional layer.

When an input image is a single-channel 2D image and when a number of kernels of a convolutional layer in an encoder is "C," a number of input feature maps of the input feature 301 generated by the encoder is "C," and accordingly a number of channels of the input feature 301 is "C." For example, a weight and a height of an input feature map of the input feature 301 are "W" and "H," the input feature map has a size of "W*H," and a size of the input feature 301 is represented by "W*H*C." In this example, the input feature 301 has a spatial size of "W*H," and the spatial size of the input feature 301 is less than a spatial size of an input image through an encoding process of the encoder. When the spatial size of the input image is assumed to be "A*B," "W*H" is less than "A*B" based on spatial sizes of kernels of a convolutional layer in the encoder, a size of a sliding stride for a convolution operation, and a size of a pad. The input feature 301 corresponds to multiple channels based on a number of kernels of a convolutional layer in the encoder, differently from a single-channel input image.

A spatial size of the feature map 302 combined with the input feature 301 is set to be equal to the spatial size of the input feature 301, and values included in the feature map 302 are represented as values corresponding to an interaction. For example, the feature map 302 with a size of "W*H" includes values corresponding to an interaction (for example, a movement) to apply a force to an image representing a rigid object, or values corresponding to an interaction (for example, a change in a shape of an object) to apply a force to an image representing a soft object. The input feature 303 includes the feature map 302 with the size of "W*H", and accordingly a size of the input feature 303 is represented by "W*H*(C+1)." A combination of values included in the feature map 302 is defined based on an interaction, and various techniques are applicable to a scheme of defining the values, based on a design intent, learning and a performance and efficiency of a system.

In an example, the image processing apparatus converts the input feature 303 to the second feature 304 to be suitable for an input of the decoder using the conversion network including the CNN. In an example, the image processing apparatus converts the input feature 303 to the second feature 304 to correspond to input nodes of the CNN of the decoder. For example, when the decoder is designed to have a structure symmetrical with that of the encoder and when the input feature 303 has a size of "W*H*(C+1)," an input layer and an output layer in the conversion network including the CNN are designed to be suitable for a feature with a size of "W*H*(C+1)" and a feature with a size of "W*H*C," respectively. The image processing apparatus converts a size or a dimension of the input feature 303 into a form that is processed by the original encoder and the decoder. To reconstruct an image using the decoder, the input feature 303 is converted.

The image processing apparatus generates, using the CNN of the decoder, a result image from the second feature 304 that is to be suitable for the CNN of the decoder. A structure of the CNN of the encoder and a structure of the CNN of the decoder are symmetrical with each other, and the input feature 301 and the second feature 304 have the same sizes. Also, a spatial size of the result image is equal to a spatial size of the input image. For example, the image processing apparatus reconstructs a result image with a size of "A*B" from the second feature 304 with a size of "W*H*C" using the decoder. However, a structure of a CNN of each of the encoder, the conversion network and the decoder is not limited to the above-described examples, and is modified using various schemes within a range of an operation of converting the input feature 301 for image processing through an interaction.

Figure 4:
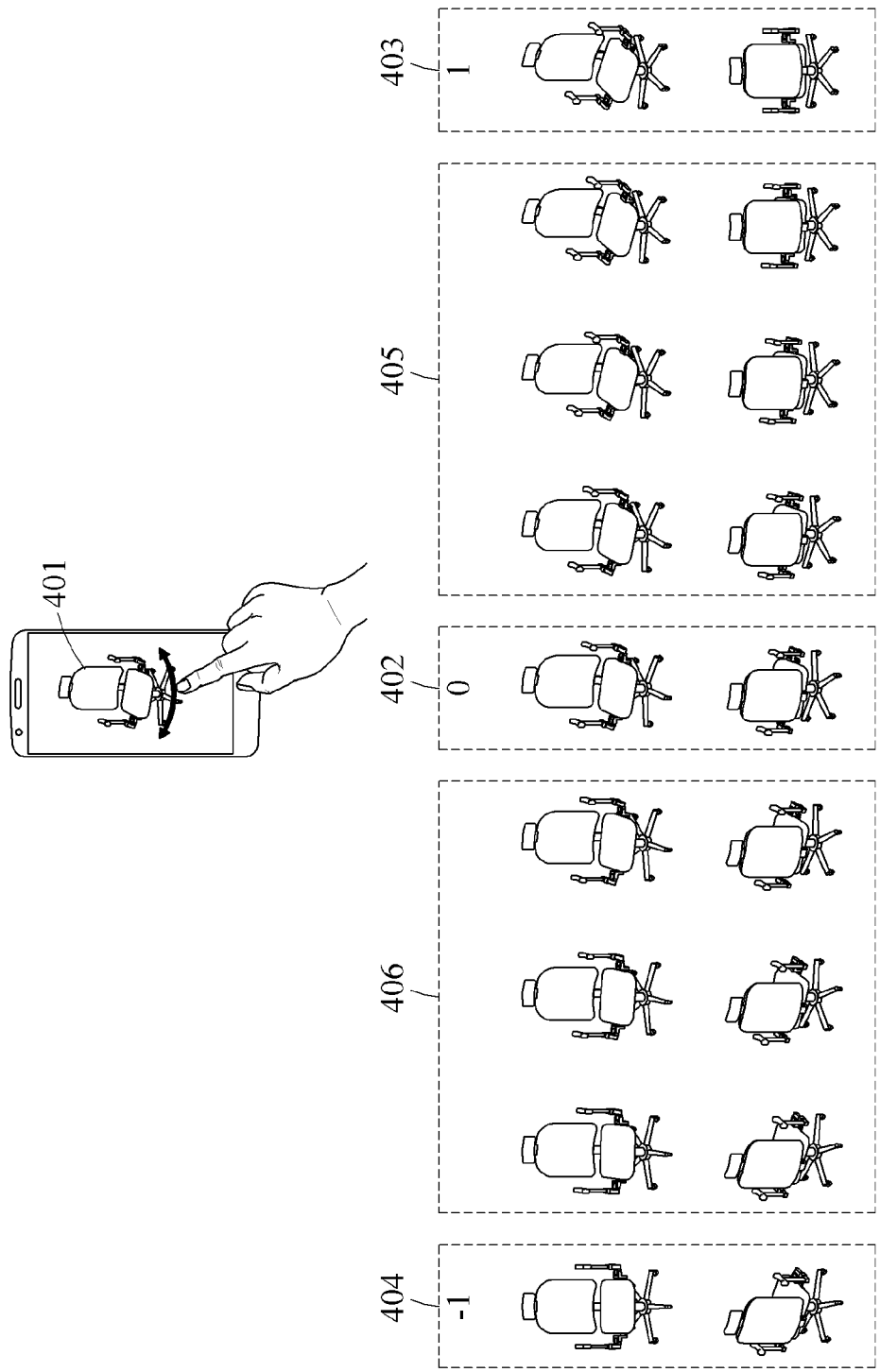
FIG. 4 illustrates an example of an image interaction processing method.

FIG. 4 illustrates an example of an image interaction processing method.

Referring to FIG. 4, an image processing apparatus identifies an interaction for an application to an input image from a user input. For example, to rotate an object included in an input image 401, a user inputs a user command to a terminal using a user interface. The image processing apparatus identifies an interaction to rotate the object included in the input image 401 from a user input received from the user. The image processing apparatus acquires or generates a feature map for combination with an input feature generated by an encoder, based on at least one value corresponding to the identified interaction. The image processing apparatus identifies an interaction corresponding to a rotation, generates a feature map based on a combination of values corresponding to a rotation angle based on a user input, and combines the generated feature map with the input feature.

According to an example, each of an encoder, a conversion network, and a decoder is implemented as a CNN trained to output a result image generated by applying an interaction to an input image. The image processing apparatus performs processing not only the learned data, but also the processing corresponding to the interaction not corresponding to the learned data through interpolation. The image processing apparatus uses an encoder, a conversion network, and a decoder, which are trained in advance for processing an interaction, and the interaction is defined based on values included in the feature map. Thus, a result image associated with an arbitrary interaction or an arbitrary object that is not included in a training DB is generated through an interpolation.

Referring to FIG. 4, when the encoder, the conversion network and the decoder are trained based on data associated with interactions of rotations with rotation angles of 0 degrees, +15 degrees (clockwise direction) and −15 degrees (counterclockwise direction), the image processing apparatus generates resulting images corresponding to interactions of rotations of the angles therebetween, i.e., between 0 degrees and +15 degrees, and between 0 degrees and −15 degrees. For example, it is assumed that a feature map corresponding to an interaction of a rotation of +15 degrees (clockwise direction) is defined to include "1," a feature map corresponding to an interaction of a rotation of −15 degrees (counterclockwise direction) is defined to include "−1," a feature map corresponding to an interaction of a non-rotation is defined to include "0," and that the encoder, the conversion network and the decoder are trained to perform interactions of rotations with rotation angles of 0 degrees, +15 degrees (clockwise direction) and −15 degrees (counterclockwise direction).

In this example, the image processing apparatus generates a result image 402 by applying the interaction of the nonrotation to the input image 401, generates a result image 403 by applying the interaction of the rotation of +15 degrees (clockwise direction) to the input image 401, and generates a result image 404 by applying the interaction of the rotation of −15 degrees (counterclockwise direction) to the input image 401. Also, for an interaction associated with a rotation angle that is not recorded in the training DB, the image processing apparatus generates result images 405 by applying an interaction of a rotation between 0 degrees and +15 degrees (clockwise direction) and result images 406 by applying an interaction of a rotation between 0 degrees and −15 degrees (counterclockwise direction), through an interpolation.

FIG. 5 illustrates another example of a feature conversion operation.

In an example, an image processing apparatus combines an input feature with feature maps corresponding to a plurality of interactions, converts the input feature combined with the feature maps to a second feature using a conversion network, and reconstructs a result image from the second feature using a decoder. The image processing apparatus generates a result image to which the plurality of interactions are applied, using a feature conversion technique that employs a plurality of feature maps.

Referring to FIG. 5, the image processing apparatus acquires an input feature 501 for a conversion. The image processing apparatus combines the input feature 501 with a first feature map 502 corresponding to a first interaction and a second feature map 503 corresponding to a second interaction. The image processing apparatus converts an input feature 504 to which the first feature map 502 and the second feature map 503 are applied, to a second feature 505 to be suitable for an input of a decoder, using a conversion network. For example, the image processing apparatus identifies user inputs corresponding to interactions of a rotation and a movement, and combines the input feature 501 with a first feature map 502 corresponding to an interaction of the rotation and a second feature map 503 corresponding to an interaction of the movement. However, various modification are applicable to a scheme of defining feature maps corresponding to a plurality of interactions, or an order or a position in which feature maps are combined with the input feature 501.

The image processing apparatus combines the input feature 501 having a size of "W*H*C" with the first feature map 502 and the second feature map 503 having a size of "W*H," to generate the input feature 504 having a size of "W*H*(C+2)." The image processing apparatus converts, using the conversion network, the input feature 504 having the size of "W*H*(C+2)" to the second feature 505 having a size of "W*H*C" to be suitable for the decoder. The image processing apparatus combines feature maps with the input feature 501 and generates a result image to which a plurality of interactions are applied using a technique of performing a conversion.

Figure 6:
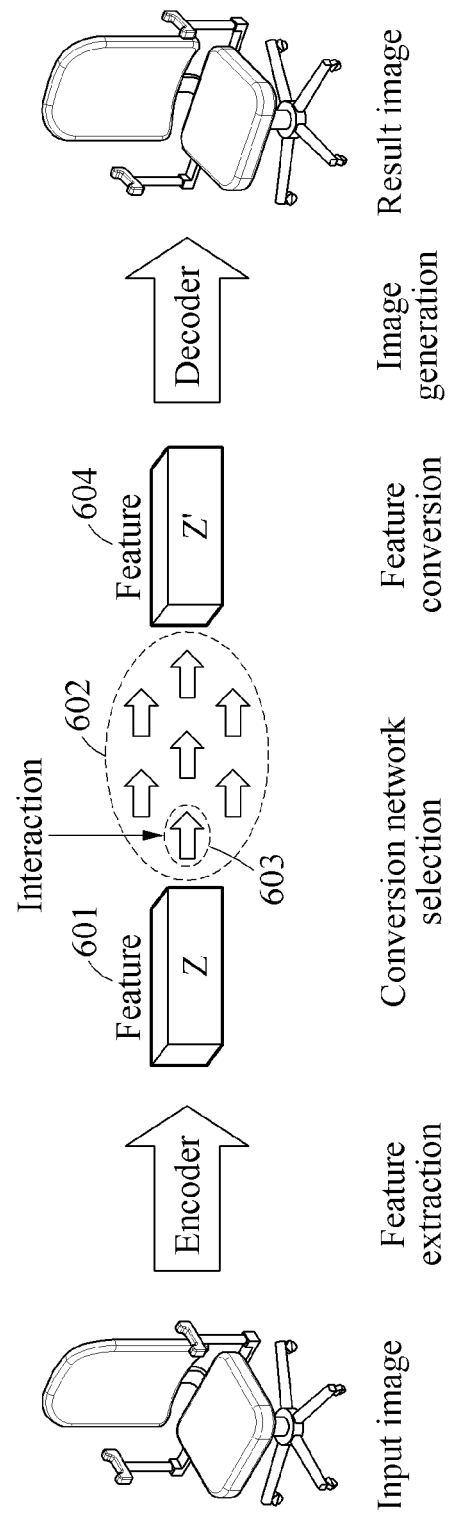
FIG. 6 illustrates an example of a feature conversion operation.

FIG. 6 illustrates another example of a feature conversion operation.

Referring to FIG. 6, an image processing apparatus acquires an input feature 601 generated by an encoder, and selects a conversion network 603 corresponding to a interaction from conversion networks 602 that are defined for each interaction. The image processing apparatus converts the input feature 601 to a second feature 604 using the selected conversion network 603. The conversion networks 602 are, for example, CNNs corresponding to a plurality of interactions. For example, a first conversion network is implemented as a CNN corresponding to an interaction of a rotation of +15 degrees (clockwise direction), a second conversion network is implemented as a CNN corresponding to an interaction of a rotation of −15 degrees (counterclockwise direction), and a third conversion network is implemented as a CNN corresponding to an interaction of a movement.

In an example, the image processing apparatus identifies an interaction for an application, and selects the conversion network 603 corresponding to the identified interaction from pre-trained conversion networks 602. The image processing apparatus inputs the input feature 601 with a size of "W*H*C" to the conversion network 603, and generates the second feature 604 with a size of "W*H*C." The image processing apparatus converts the input feature 601 to the second feature 604 using the conversion network 603 without a change in the size. In this example, an input layer and an output layer of the conversion network 603 are designed to be suitable for a feature with a size of "W*H*C" and are trained.

In an example, the image processing apparatus selects a plurality of conversion networks from the conversion networks 602 for application of the identified interaction, combines the selected conversion networks or applies a weight, to generate the second feature 604. For example, when a conversion network corresponding to a provided interaction is not included in the conversion networks 602, the image processing apparatus applies a weight or combines a plurality of conversion networks to be similar to the conversion network corresponding to the provided interaction. Various techniques may be employed to combine a plurality of conversion networks among the pre-trained conversion networks 602 or to apply weights to a plurality of conversion networks among the pre-trained conversion networks 602.

FIG. 7 illustrates another example of an image interaction processing method.

An image processing apparatus identifies an interaction for an application to an input image from a user input. For example, the image processing apparatus receives an input of a selection of one of interactions corresponding to pre-trained conversion networks, and identifies an interaction for an application to the input image based on the received input. The image processing apparatus determines whether a conversion network corresponding to the identified interaction is included in the pre-trained conversion networks. Referring to FIG. 7, the image processing apparatus receives an input of a selection of one of interactions of rotations corresponding to rotation angles, identifies an interaction based on the received input, and processes an interaction of an image using a conversion network corresponding to the identified interaction.

Figure 8:
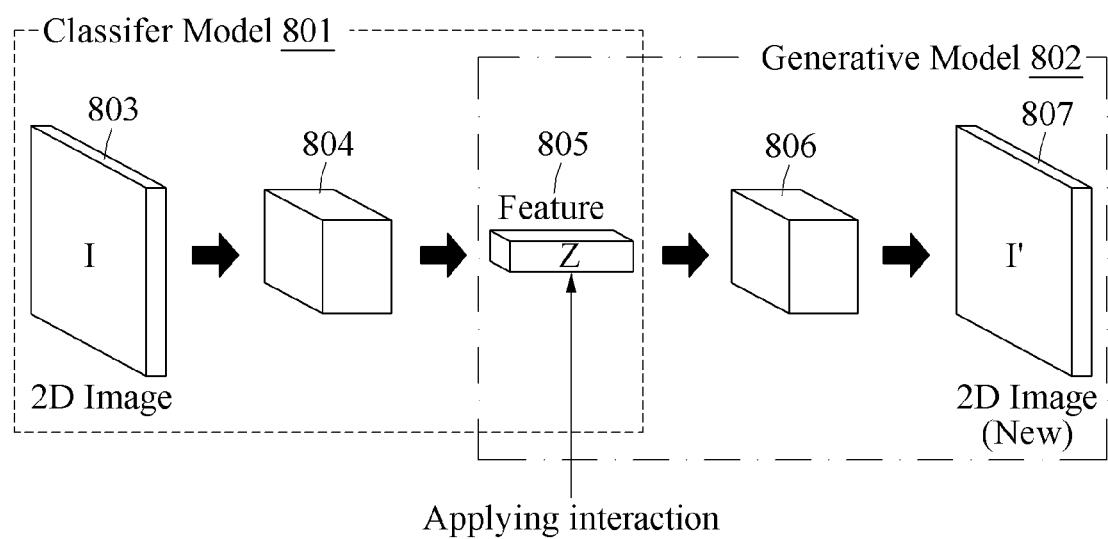
FIG. 8 illustrates an example of an image interaction processing method.

FIG. 8 illustrates another example of an image interaction processing method.

Referring to FIG. 8, the image processing apparatus processes an image interaction using a network of an encoder corresponding to a classifier model 801 and a decoder corresponding to a generative model 802. The image processing apparatus generates, using the classifier model 801, an intermediate feature 804 by increasing a number of channels while reducing a spatial size of a 2D input image 803, and generates an input feature 805. As described above, the image processing apparatus converts the input feature 805 for processing of an interaction, generates an intermediate feature 806 by reducing a number of channels while increasing a spatial size of the input feature 805 and generates a result image 807 using the generative model 802. The image processing apparatus applies an interaction to a generated feature and processes an image interaction using the network of the encoder and the decoder.

Figure 9:
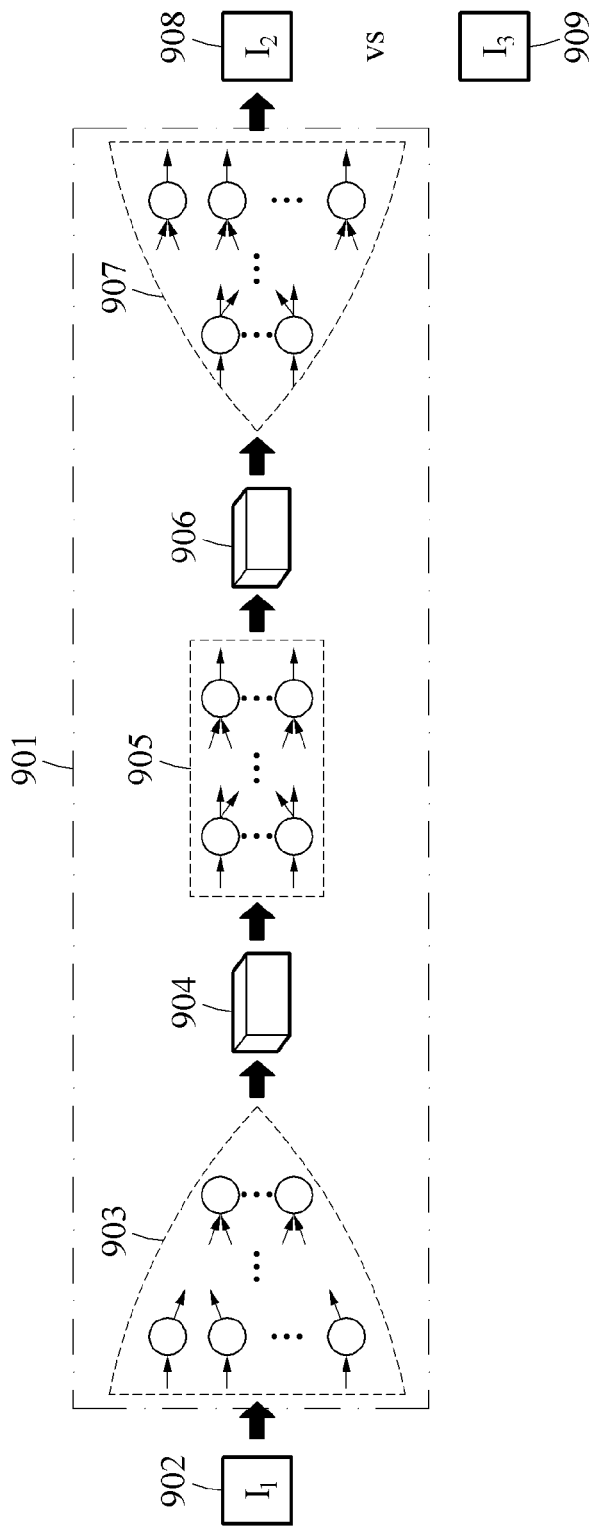
FIG. 9 illustrates an example of a training method to process an image interaction.
Figure 10:
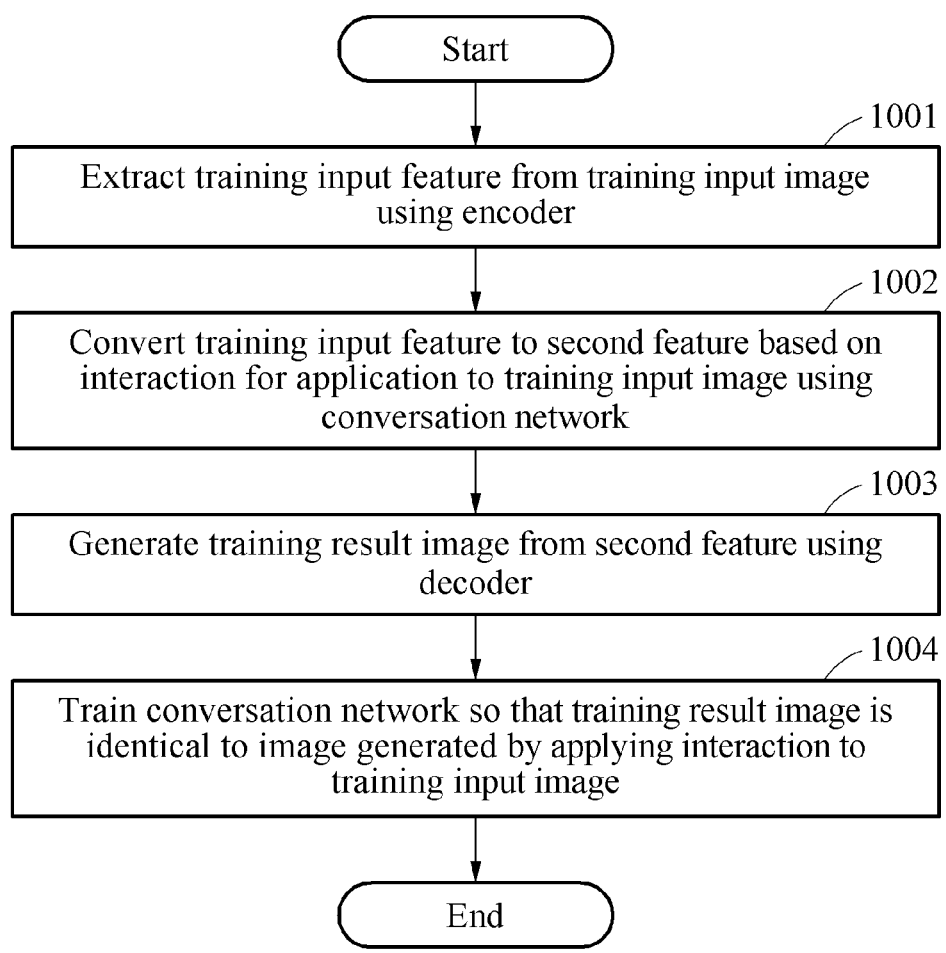
FIG. 10 is a diagram illustrating an example of a training method to process an image interaction.

FIG. 9 illustrates an example of a training method to process an image interaction, and FIG. 10 illustrates an example of a training method to process an image interaction.

Referring to FIG. 9, a training apparatus is an apparatus configured to perform training for an image interaction processing, and is implemented on a hardware module. The training apparatus trains an image processing apparatus 901 to process an image interaction without an error. For example, the training apparatus repeatedly trains an encoder 903, a conversion network 905 and a decoder 907 of the image processing apparatus 901, based on training input images, images generated by applying an interaction to the training input images, and result images generated based on the training input images. In an example, the training input images are images used for training, and the result images are images generated by the image processing apparatus 901. The images generated by applying the interaction to the training input images are images required to be generated by the image processing apparatus 901, and the training apparatus trains the image processing apparatus 901 so that the result images are similar to the images generated by applying the interaction to the training input images.

FIG. 10 illustrates an example of a training method to process an image interaction. The operations in FIG. 10 may be performed in the sequence and manner as shown, although the order of some operations may be changed or some of the operations omitted without departing from the spirit and scope of the illustrative examples described. Many of the operations shown in FIG. 10 may be performed in parallel or concurrently. One or more blocks of FIG. 10, and combinations of the blocks, can be implemented by special purpose hardware-based computer that perform the specified functions, or combinations of special purpose hardware and computer instructions. In addition to the description of FIG. 10 below, the descriptions of FIGS. 1-9 are also applicable to FIG. 10, and are incorporated herein by reference. Thus, the above description may not be repeated here.

Referring to FIGS. 9 and 10, in operation 1001, the training apparatus extracts a training input feature 904 from a training input image 902 using the encoder 903.

In operation 1002, the training apparatus converts the training input feature 904 to a second feature 906 using the conversion network 905 based on an interaction for an application to the training input image 902. In an example, the training apparatus combines a feature map corresponding to the interaction with the training input feature 904, and converts, using the conversion network 905, a training input feature to which the feature map is applied, to the second feature 906 to be suitable for an input of the decoder 907. In an example, the training apparatus combines the training input feature 904 with a first feature map corresponding to a first interaction and a second feature map corresponding to a second interaction, and converts, using the conversion network 905, a training input feature to which the first feature map and the second feature map are applied, to the second feature 906 to be suitable for the input of the decoder 907. In another example, the training apparatus selects the conversion network 905 corresponding to an interaction from conversion networks defined for each interaction, and converts the training input feature to the second feature 906 using the selected conversion network 905.

In operation 1003, the training apparatus generates a training result image 908 from the second feature 906 using the decoder 907. In operation 1004, the training apparatus trains the conversion network 905 so that the training result image 908 is identical to an image 909 generated by applying the interaction to the training input image. In an example, the training apparatus trains the encoder 903 and decoder 907 so that the training result image 908 is identical to the image 909. The training apparatus performs training based on a loss function that is defined based on a difference between the training result image 908 and the image 909, however, a type of training-related techniques is not limited to the ones described above. For example, the loss function is defined based on a difference in pixel values between the training result image 908 and the image 909. For example, the training apparatus trains a network of the encoder 903 and the decoder 907 in advance to perform an operation of extracting a feature and reconstructing an image, adds the conversion network 905 to the trained encoder 903 and the trained decoder 907, and performs training for an interaction processing. Training input features are extracted from training input images by the encoder 903, and training result images are generated from the extracted training input features by the decoder 907. Also, the encoder 903 and the decoder 907 are trained in advance so that the training input images are identical to the training result images.

Figure 11:
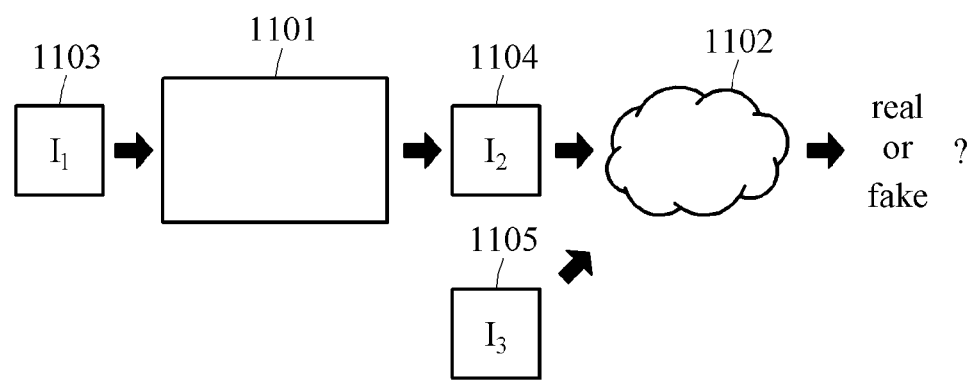
FIG. 11 illustrates an example of a training method to process an image interaction.

FIG. 11 illustrates another example of a training method to process an image interaction.

Referring to FIG. 11, a training apparatus uses a discriminator network 1102 based on a generative adversarial network (GAN), to increase a training performance. As described above, the training apparatus generates a training result image 1104 from a training input image 1103 using an image processing apparatus 1101. In an example, to increase the training performance, the training apparatus trains the image processing apparatus 1101 together with the discriminator network 1102 based on the training result image 1104 and an image 1105 generated by applying an interaction to the training input image 1103. The training apparatus trains the discriminator network 1102 to determine that the training result image 1104 is a fake image and determine that the image 1105 is a real image. The training apparatus trains the image processing apparatus 1101 during training of the discriminator network 1102. The training apparatus trains the image processing apparatus 1101 based on the training result image 1104 and the image 1105 so that the discriminator network 1102 determines the training result image 1104 as a real image, not a fake image. As described above, the training apparatus simultaneously trains the image processing apparatus 1101 and the discriminator network 1102, and thus it is possible to increase a recognition performance of the image processing apparatus 1101 and the discriminator network 1102 and possible to lessen a phenomenon in which a result image becomes blurred.

In another example, the training apparatus trains the image processing apparatus 1101 based on the discriminator network 1102 that is trained in advance. The discriminator network 1102 is trained in advance to determine that the training result image 1104 is a fake image and determine that the image 1105 is a real image. The training apparatus trains the image processing apparatus 1101 so that the pre-trained discriminator network 1102 determines the training result image 1104 as a real image, not a fake image.

Figure 12:
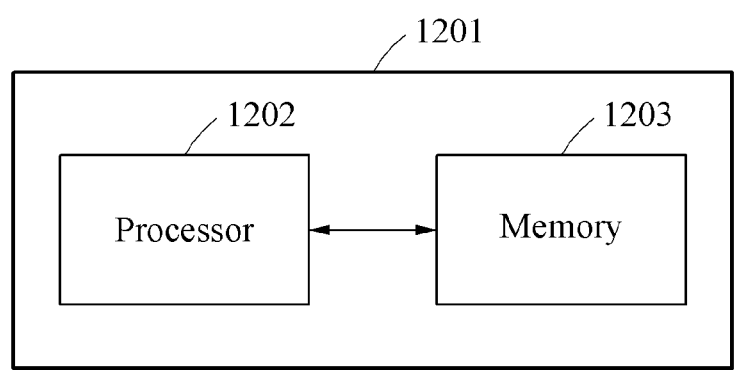
FIG. 12 illustrates an example of a configuration of an apparatus.

FIG. 12 illustrates an example of a configuration of an apparatus 1201.

Referring to FIG. 12, the apparatus 1201 includes a processor 1202 and a memory 1203. The apparatus 1201 is, for example, the above-described image processing apparatus or the above-described training apparatus. The processor 1202 includes at least one apparatus described above with reference to FIGS. 1 through 11, or performs at least one method described above with reference to FIGS. 1 through 11. The memory 1203 stores the above-described image interaction processing method, information associated with the image interaction processing method, the above-described training method, or information associated with the training method. Also, the memory 1203 stores a program in which the image interaction processing method or the training method is implemented. The memory 1203 includes, for example, a volatile memory or a nonvolatile memory. Further description of the processor and the memory is provided below.

The processor 1202 executes the program and controls the apparatus 1201. A code of the program executed by the processor 1202 is stored in the memory 1203. The apparatus 1201 is connected to an external device (for example, a personal computer (PC) or a network) via an input/output device (not shown) and exchanges data with the external device.

The image processing apparatuses 901 and 1101, encoder 102 and 903, decoder 105 and 907, apparatus 1201 and other apparatuses, units, modules, devices, and other components described herein with respect to FIGS. 1, 9, 11 and 12 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2 and 10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the method of preventing the collision. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of processing an interaction with an object in an input image, the method comprising:
   extracting, using an encoder, an input feature from the input image;
   identifying the interaction for an application to the input image from a user input;
   converting the input feature to a second feature based on the interaction for the application to the input image; and
   generating, using a decoder, a result image from the second feature,
   wherein the interaction comprising any one or any combination of a rotation, a movement, and a transformation of the object in the input image,
   wherein the converting of the input feature comprises
      combining the input feature with a first feature map corresponding to a first interaction and a second feature map corresponding to a second interaction, and
      converting the input feature combined with the first feature map and the second feature map to the second feature that is suitable for an input of the decoder, and
   wherein the input feature has a same spatial size as the second feature.

2. The method of claim 1, wherein the converting of the input feature comprises:
   combining a feature map corresponding to the interaction with the input feature; and
   converting, using a conversion network, the input feature combined with the feature map to the second feature that is suitable for an input of the decoder.

3. The method of claim 2, wherein the feature map comprises a value corresponding to the interaction.

4. The method of claim 2, further comprising:
   identifying an interaction for application to the input image from the user input,
   wherein the converting of the input feature comprises generating a feature map for combination with the input feature using a value corresponding to the identified interaction.

5. The method of claim 1, wherein the converting of the input feature comprises:
   selecting a conversion network corresponding to the interaction from conversion networks defined for each interaction; and
   converting the input feature to the second feature using the selected conversion network.

6. The method of claim 5, further comprising:
   identifying an interaction for an application to the input image from the user input, wherein the converting of the input feature further comprises identifying a conversion network corresponding to the identified interaction from the conversion networks.

7. The method of claim 1, wherein
the input image and the result image are single-channel two-dimensional (2D) images,
the input feature comprises feature maps that have spatial sizes less than a spatial size of the input image, and
the second feature comprises feature maps that have spatial sizes less than a spatial size of the result image.

8. The method of claim 1, wherein a spatial size of the input image is equal to a spatial size of the result image.

9. The method of claim 1, wherein
the encoder comprises a convolutional neural network (CNN) configured to generate a multi-channel feature from a single-channel 2D image, and
the decoder comprises a CNN configured to generate a single-channel 2D image from a multi-channel feature.

10. A non-transitory computer-readable storage medium storing instructions that, when executed by a processor, cause the processor to perform the method of claim 1.

11. A training method to process an image interaction with an object in a training input image, the training method comprising:
extracting, using an encoder, a training input feature from the training input image;
converting, using a conversion network, the training input feature to a second feature based on the interaction for an application to the training input image;
generating, using a decoder, a training result image from the second feature; and
training the conversion network so that the training result image is substantially identical to an image generated by applying the interaction to the training input image,
wherein the interaction comprising any one or any combination of a rotation, a movement and a transformation of the object in the input image,
wherein the converting of the training input feature comprises
combining the training input feature with a first feature map corresponding to a first interaction and a second feature map corresponding to a second interaction; and
converting, using the conversion network, the training input feature combined with the first feature map and the second feature map to the second feature that is suitable for an input of the decoder, and
wherein the input feature has a same spatial size as the second feature.

12. The training method of claim 11, wherein the converting of the training input feature comprises:
combining a feature map corresponding to the interaction with the training input feature; and
converting, using the conversion network, the training input feature combined with the feature map to the second feature that is suitable for an input of the decoder.

13. The training method of claim 11, wherein the converting of the training input feature comprises:
applying a weight to a first feature map, in response to a feature map corresponding to the interaction being absent; and
converting, using the conversion network, the training input feature combined with the first feature map to the second feature that is suitable for an input of the decoder.

14. The training method of claim 11, wherein the converting of the training input feature comprises:
combining a first feature map with a second feature map to obtain a combined feature map, in response to a feature map corresponding to the interaction being absent; and
converting, using the conversion network, the training input feature combined with the combined feature map to the second feature that is suitable for an input of the decoder.

15. The training method of claim 11, wherein the converting of the training input feature comprises:
selecting a conversion network corresponding to the interaction from conversion networks defined for each interaction; and
converting the training input feature to the second feature using the selected conversion network.

16. The training method of claim 11, further comprising:
training the encoder and the decoder so that the training result image is substantially identical to the image generated by applying the interaction to the training input image.

17. The training method of claim 11, wherein
training input features are extracted by the encoder from training input images,
training result images are generated by the decoder from the training input features, and
the encoder and the decoder are pre-trained so that the training input images are substantially identical to the training result images.

18. A non-transitory computer-readable storage medium storing instructions that, when executed by a processor, cause the processor to perform the method of claim 11.

19. An apparatus for processing an image interaction with an object in an input image, the apparatus comprising:
a processor comprising an encoder and a decoder, the processor being configured to:
extract, using the encoder, an input feature from the input image;
identify the interaction for an application to the input image from a user input;
convert the input feature to a second feature based on the interaction for the application to the input image; and
generate, using the decoder, a result image from the second feature,
wherein the interaction comprising any one or any combination of a rotation, a movement and a transformation of the object in the input image,
wherein the processor is further configured to
combine the input feature with a first feature map corresponding to a first interaction and a second feature map corresponding to a second interaction; and
convert the input feature combined with the first feature map and the second feature map to the second feature that is suitable for an input of the decoder,
wherein the input feature has a same spatial size as the second feature.

20. The apparatus of claim 19, wherein the processor is further configured to:
combine a feature map corresponding to the interaction with the input feature; and
convert, using a conversion network, the input feature combined with the feature map to the second feature that is suitable for an input of the decoder.

21. The apparatus of claim 19, wherein the processor is further configured to:

select a conversion network corresponding to the interaction from conversion networks defined for each interaction; and
convert the input feature to the second feature using the selected conversion network.

22. The apparatus of claim 19, wherein
the input image and the result image are single-channel two-dimensional (2D) images;
the input feature comprises feature maps that have spatial sizes less than a spatial size of the input image; and
the second feature comprises feature maps that have spatial sizes less than a spatial size of the result image.

23. The apparatus of claim 19, wherein
the encoder comprises a convolutional neural network (CNN) configured to generate a multi-channel feature from a single-channel 2D image; and
the decoder comprises a CNN configured to generate a single-channel 2D image from a multi-channel feature.

24. The apparatus of claim 19, wherein the interaction comprises any one or any combination of a rotation, a movement and a transformation of an object in the input image.

25. A training apparatus to process an image interaction with an object in a training input image, the training apparatus comprising:
a processor comprising an encoder and a decoder, the processor being configured to:
extract, using the encoder, a training input feature from the training input image;
convert, using a conversion network, the training input feature to a second feature based on the interaction for an application to the training input image;
generate, using the decoder, a training result image from the second feature; and
train the conversion network so that the training result image is substantially identical to an image generated by applying the interaction to the training input image,
wherein the interaction comprising any one or any combination of a rotation, a movement and a transformation of an object in the input image,
wherein the processor is further configured to:
combine the training input feature with a first feature map corresponding to a first interaction and a second feature map corresponding to a second interaction; and
convert, using the conversion network, the training input feature combined with the first feature map and the second feature map to the second feature that is suitable for an input of the decoder,
wherein the input feature has a same spatial size as the second feature.

26. The training apparatus of claim 25, wherein the processor is further configured to:
combine a feature map corresponding to the interaction with the training input feature; and
convert, using the conversion network, the training input feature combined with the feature map to the second feature that is suitable for an input of the decoder.

27. The training apparatus of claim 25, wherein the processor is further configured to
select a conversion network corresponding to the interaction from conversion networks defined for each interaction; and
convert the training input feature to the second feature using the selected conversion network.

* * * * *